Figure 6:
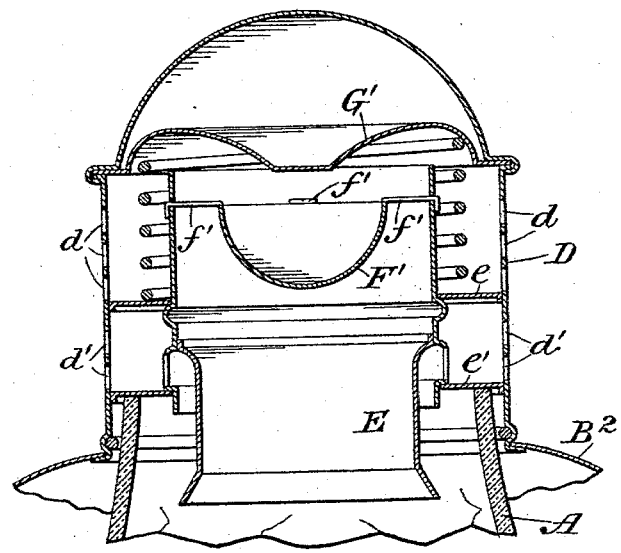

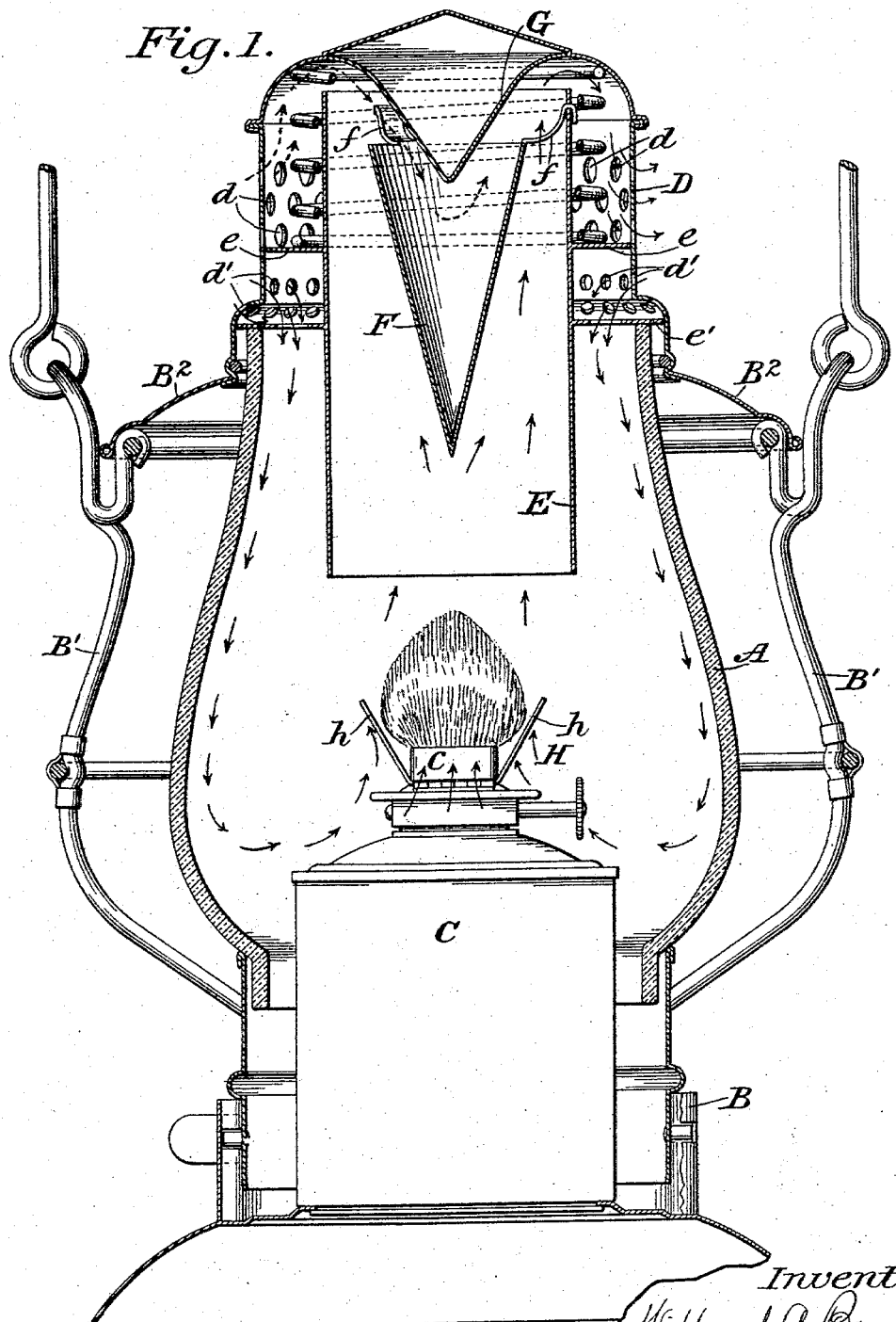

(No Model.)  3 Sheets—Sheet 2.
W. A. BOURNE.
VENTILATOR FOR LANTERNS, &c.
No. 569,572. Patented Oct. 13, 1896.
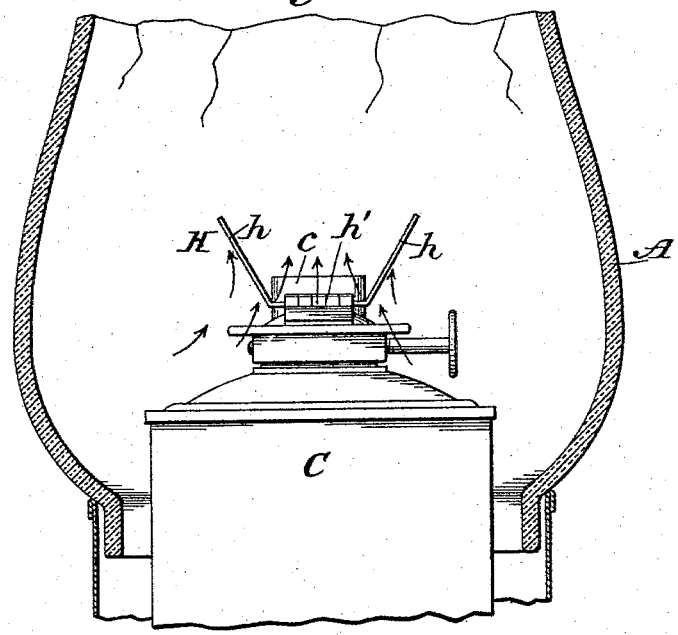
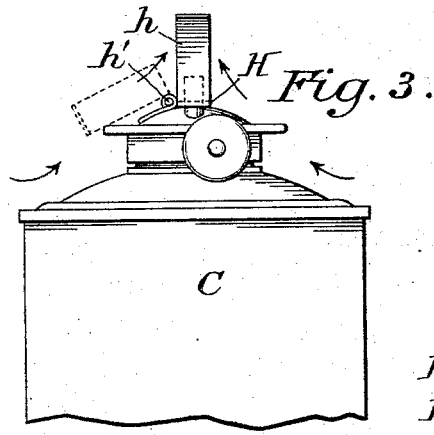
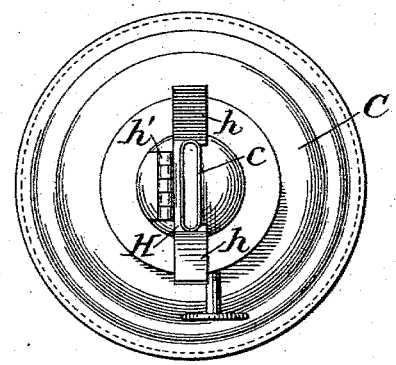
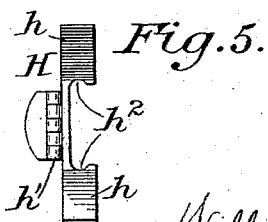
Attest:
A. N. Jesbera.
Chas. E. Epworth.
Inventor:
Willard A. Bourne
by Redding, Kiddle & Greeley
Attys.

(No Model.) 3 Sheets—Sheet 3.

W. A. BOURNE.
VENTILATOR FOR LANTERNS, &c.

No. 569,572. Patented Oct. 13, 1896.

Attest:
A. N. Jesbera
Chas. E. Epworth

Inventor:
Willard A. Bourne
by Redding, Kiddle & Greeley
Attys.

UNITED STATES PATENT OFFICE.

WILLARD A. BOURNE, OF NEW YORK, N. Y.

VENTILATOR FOR LANTERNS, &c.

SPECIFICATION forming part of Letters Patent No. 569,572, dated October 13, 1896.

Application filed June 20, 1896. Serial No. 596,231. (No model.)

*To all whom it may concern:*

Be it known that I, WILLARD A. BOURNE, a citizen of the United States, residing in the city, county, and State of New York, have invented certain new and useful Improvements in Ventilators for Lanterns, Lamps, &c., of which the following is a specification, reference being had to the accompanying drawings, forming a part hereof.

My invention relates in the main to ventilators which are intended to promote combustion at a source of heat or heat and light below the ventilator and to assist in carrying off the products of combustion, and although my improvements have been designed and are illustrated herein with especial reference to their adaptation to lanterns it will be readily understood as the details of construction are explained that my improvements are no less applicable to other special purposes, such, for example, as the ventilation of a room or a car which is lighted artificially by a centrally-disposed chandelier.

In part, also, my invention relates to devices employed in connection with the ventilating devices in lanterns and lamps to regulate the shape of the flame. One cause of the low efficiency of a lamp or gas flame as compared with the theoretical results which should be obtained from the use of a given quantity of an illuminant of standard quality is the failure to remove immediately and completely the products of combustion, which, especially in lanterns, are returned sometimes and to some extent to the point of combustion, thereby interfering with the proper supply of oxygen and occasioning imperfect combustion. Another cause not only of low efficiency, but also of the frequent extinguishment of the flame altogether in any structure, whether it be a lamp or a lantern or a room in which there is a ventilating-opening above the flame, is the back draft which is sometimes established, especially in the case of lanterns which are exposed to currents of air. It is the object of my invention, primarily, to remove both of these causes of trouble by effecting the immediate removal of the products of combustion and by preventing the possibility of back drafts. Incidentally to the attainment of these main objects I promote the supply of oxygen to the flame, so that the combustion shall be of the proper character and a maximum of light obtained, prevent the accumulation of the products of combustion in the globe of a lantern or lamp, and consequently the deposit of watery and other vapors on the inside of the globe, which has hitherto been a serious difficulty, especially in the use of railroad, marine, and other signal lamps or lanterns in cold weather, prevent the flame from being drawn out of that shape which will give the best results and protect the oil-fount from contact with cold air, thereby avoiding the chilling of the oil.

Figure 7:
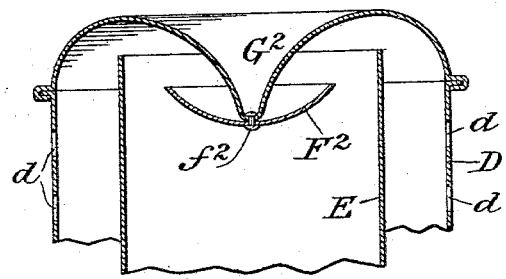

In the accompanying drawings, in which I have illustrated my improvement as adapted to an ordinary lantern, Figure 1 is a vertical central section of a lantern to which my improvement is applied, the direction of the currents within the globe being indicated by arrows and the fount and burner being shown in elevation. Fig. 2 is a side elevation of the upper portion of the fount and burner with a portion of the globe shown in section to illustrate the deflector attached to the burner to protect the flame. Fig. 3 is a side elevation of the fount and burner with deflector at right angles to the elevation of the lamp in Fig. 2, the position of the deflector when turned back being indicated by dotted lines. Fig. 4 is a plan view of the fount and burner with deflector. Fig. 5 is a detail view of the deflector shown in Figs. 2, 3, and 4. Figs. 6 and 7 are vertical central sections of the upper part of the lantern, illustrating different forms of the back-draft deflector.

The chamber to be ventilated is represented in the embodiment which I have chosen for illustration of my invention by an ordinary lantern-globe A, which is shown as supported by a base B, preferably without openings for the admission of air, and protected by a wire framework B', the latter, as usual, supporting the hood B² and the dome or cap, which is fully described hereinafter. As the source of light and heat I have represented an ordinary lamp or oil-fount C.

The ventilating dome or cap embodies in its construction the principal features of my invention. As shown in Fig. 1, it comprises an outer shell D, which is perforated, as at $d\ d$ and at $d'\ d'$, an inner tube or cylinder E, to which is secured an imperforate annular diaphragm $e$, which completely closes the space between the shell D and the cylinder, and is located between the upper perforations $d\ d$ and the lower perforations $d'\ d'$. The tube or cylinder E is also provided with a perforated diaphragm $e'$, which may rest upon the globe A, but allows free passage of air from the perforations $d'\ d'$ downward into the globe in proximity to the inner wall thereof. The cylinder E rises within the shell D above the highest perforations $d\ d$ therein, while allowing free passage over its upper edge, but standing as a solid wall in the path of any direct current inward through the perforations $d\ d$. Centrally within the cylinder E is supported by any suitable means, as by arms $f\ f$, a deflector F, the same being supported at some distance below the upper edge of the cylinder E and being far enough therefrom to permit free passage of the heated air, gases, and vapor as they rise from the globe. A second deflector G is formed with or supported by the top of the cap or shell D, being disposed in alinement with the deflector F.

The function of the two deflectors F and G is to direct any back draft or currents of air which may enter from the outside of the shell D on one side outward over the edge of the cylinder E on the other side, preventing such back drafts from reaching the flame of the lamp. The deflector G is substantially conical in shape with its apex downward, and the upper surface of the deflector F is adapted to receive the currents of air as they enter on one side and are deflected downward against it by the deflector G and direct them upward on the other side of the deflector G, so that they shall pass out on the other side over the edge of the cylinder E and through the perforations $d\ d$ in the shell D. As the deflector F is necessarily interposed in the path of the heated air, gases, or vapor as they rise from the globe, its under surface should be so shaped as to afford the least possible obstruction to the free upward movement of such heated air, gases, or vapor and be the least likely to create eddies in the rising currents. For this reason the most desirable and effective form of the deflector F is that of a hollow cone, supported with its apex downward and its open mouth upward, such a deflector dividing the rising currents most easily and offering the least obstruction to their passage; but it will be understood that the same functions may be performed by deflectors of other shapes, such, for example, as those referred to hereinafter. The deflector G is also preferably a cone with its apex downward, but not necessarily a true cone. It will be understood, moreover, that the cone G operates as an additional safeguard to insure the depression of such currents as may enter against the deflector F in a proper manner to be deflected by it and turned upward on the other side, as otherwise some portions of such currents, as they pass across the top of the cylinder E, might strike the cylinder at the opposite side from that at which they entered and so be turned down into the globe sufficiently to interfere with the normal currents therein.

In the construction shown in Fig. 6 the shell D and cylinder E are arranged substantially as before. The deflector G' is represented as having the shape substantially of the frustum of a cone with its base upward, while the deflector F' is a hollow body with flaring sides, supported with its small end or apex downward and its open base upward, being represented as substantially a hemisphere. It is represented as supported by arms $f'\ f'$. In the construction shown in Fig. 7 the deflector $G^2$ is substantially conical in shape, as before, while the deflector $F^2$ is a hollow body with curved sides, somewhat as shown in Fig. 6, but shallower, and is supported by being secured directly to the apex of the deflector $G^2$, as by a rivet $f^2$.

If the fresh air to supply the oxygen necessary to combustion is admitted over the top of the globe A, as I prefer, such air descends within the globe close to the inner wall thereof, and being cool and descending rapidly protects the globe from the condensation of such vapors as are not carried off completely through the ventilator. In this manner I have been able to bring about as a result that there is no appreciable condensation on the globe even when the lantern is exposed to very low temperatures. Moreover, the cold air in this manner is kept from coming in contact with the oil-fount and therefore is prevented from chilling the oil, which frequently happens in lanterns in which the air enters at the bottom and is continually absorbing heat from the oil-fount and oil. When the enveloping current of fresh air has descended nearly to the bottom of the globe, it turns inwardly toward the flame of the lamp to supply thereto the necessary oxygen. As the heated air and products of combustion rise above the flame of the lamp they strike and are divided by the under side of the lower deflector and pass upward on all sides of the same between it and the imperforate cylinder E and then pass over the upper edge of said cylinder and downward and outward through the perforations in the shell. As the descending portion of this current outside of the cylinder E is short as compared with the ascending portion thereof within the cylinder the outward flow of the products of combustion is very free, and consequently all gases and vapors are quickly and thoroughly removed from within the globe, there is practically no accumulation of carbonic-acid gas to smother the flame when the lantern is shaken, and the supply of oxygen to the flame is so well maintained that the usual incrusting of the wick, which reduces the light-giving power, proceeds very much more slowly than in ordinary lanterns, as has been demonstrated by repeated comparisons with lanterns of standard makes employing standard illuminants.

The supply of fresh air to the flame of the lamp is so copious that the tendency of the flame is to become narrow and high, with the result that the combustion at the apex of the flame is not so complete as it should be and there is an increase in the amount of smoke and a reduction in the light-giving power of the flame. I have therefore provided a deflector or flame-guard, as shown in Figs. 1, 2, 3, 4, and 5. This comprises, essentially, two wings h h, which project upwardly and outwardly below the edges of the flame, as clearly represented in Fig. 1, and prevent the rising currents of fresh air from striking directly against the edges of the flame. The wings h h are preferably formed as parts of a plate H, which is hinged at one side of the wick-tube c, as at h', and is cut out, as at h², to spring around the edges of the wick-tube when the deflector or guard is turned from the position shown in dotted lines in Fig. 3, in which position it offers no obstruction to the trimming of the wick, to the operative position shown in full lines in said figure.

It will be understood that I do not intend to limit myself to the precise relations and proportions I have represented in the accompanying drawings, nor to the particular use I have referred to herein for the ventilator, as it is obvious that such relations and proportions may be varied and that the ventilator is capable of use in other structures than that shown.

I claim as my invention—

1. In a ventilator, the combination of an outer perforated shell, an inner, imperforate tube or cylinder, having its upper edge above the perforations in the outer shell, and a deflector supported centrally within said cylinder and free therefrom, said deflector having its upper surface formed to deflect upwardly on the opposite side such currents of air as may pass over the edge of said tube or cylinder on the one side and strike the deflector, and having its under surface formed to divide the rising currents of heated air and gases, substantially as shown and described.

2. In a ventilator, the combination of an outer perforated shell, an inner, imperforate tube or cylinder having its upper edge above the perforations in the outer shell, a deflector supported centrally within said tube or cylinder and free therefrom, said deflector having its upper surface formed to deflect upwardly on the opposite side such currents of air as may pass over the edge of the tube or cylinder on the one side and strike the deflector, and having its under surface formed to divide the rising currents of heated air and gases, and a substantially conical deflector supported above the first-named deflector in line therewith and with its smaller end downward, substantially as shown and described.

3. In a ventilator, the combination of an outer perforated shell, an inner, imperforate tube or cylinder having its upper edge above the perforations in the outer shell, and a hollow deflector with flaring walls supported centrally within said tube or cylinder and free therefrom, with its apex downward and its open base upward and below the upper edge of said cylinder.

4. In a ventilator, the combination of an outer perforated shell, an inner, imperforate tube or cylinder having its upper edge above the perforations in the outer shell, a hollow deflector with flaring walls supported centrally within said tube or cylinder and free therefrom, with its apex downward and its open base upward and below the upper edge of said tube or cylinder and a substantially conical deflector supported by said shell above the first-named deflector and in line therewith and with its smaller end downward, substantially as shown and described.

5. In a ventilator, the combination of an outer perforated shell, an inner, imperforate tube or cylinder having its edge above the perforations in the outer shell, and a hollow cone supported centrally within said tube or cylinder and free therefrom, with its apex downward and its open base upward and below the upper edge of said tube or cylinder, substantially as shown and described.

6. In a ventilator, the combination of an outer perforated shell, an inner, imperforate tube or cylinder having its edge above the perforations in the outer shell, a hollow cone supported centrally within said tube or cylinder and free therefrom, with its apex downward and its open base upward and below the upper edge of said tube or cylinder, and a second cone supported by said shell above the first-named cone and in line therewith and with its point downward, substantially as shown and described.

7. In a lamp or lantern, the combination with the wick-tube of a plate hinged to one side of said wick-tube and cut out to fit around the edges of said wick-tube, the end portions of said plate being turned upwardly to protect the edges of the flame from air rising from below, substantially as shown and described.

This specification signed and witnessed this 19th day of June, A. D. 1896.

WILLARD A. BOURNE.

In presence of—
W. B. GREELEY,
A. N. JESBERA.